(12) United States Patent
Wents

(10) Patent No.: US 8,006,948 B2
(45) Date of Patent: Aug. 30, 2011

(54) CORNER ACCESORY FOR DUCTS

(75) Inventor: Thierry Wents, Longue Vue (FR)

(73) Assignee: Legrand France, Limoges (FR)

( * ) Notice: Subject to any disclaimer, the term of this patent is extended or adjusted under 35 U.S.C. 154(b) by 434 days.

(21) Appl. No.: 12/326,949

(22) Filed: Dec. 3, 2008

(65) Prior Publication Data

US 2009/0145054 A1    Jun. 11, 2009

(30) Foreign Application Priority Data

Dec. 6, 2007 (FR) ..................... 07 08521

(51) Int. Cl.
- A47B 96/06 (2006.01)
- A47G 29/00 (2006.01)
- A47K 1/00 (2006.01)
- E04G 3/00 (2006.01)
- E04G 5/06 (2006.01)
- F21V 21/00 (2006.01)
- F21V 35/00 (2006.01)

(52) U.S. Cl. ................. 248/220.1; 174/68.1; 174/480; 174/481; 174/72 C; 52/220.7; 52/220.1

(58) Field of Classification Search ............ 248/220.1, 248/200, 68.1; 174/68.1, 480, 481, 72 C, 174/68.3; 52/287.1, 288.1, 220.7, 290, 220.1
See application file for complete search history.

(56) References Cited

U.S. PATENT DOCUMENTS

| | | | | |
|---|---|---|---|---|
| 689,894 | A * | 12/1901 | Lutz ........................... | 285/184 |
| 3,957,084 | A * | 5/1976 | Jung ........................... | 138/122 |
| 6,417,452 | B1 * | 7/2002 | Doshita ...................... | 174/72 A |
| 6,478,499 | B1 * | 11/2002 | Fugman et al. ............. | 403/82 |
| 6,523,791 | B2 * | 2/2003 | Bernard et al. ............. | 248/68.1 |
| 6,585,195 | B2 * | 7/2003 | Wentworth et al. ......... | 248/49 |
| 6,599,056 | B1 * | 7/2003 | Piole et al. .................. | 403/382 |
| 6,609,684 | B2 * | 8/2003 | Van Scoy et al. ........... | 248/49 |
| 6,677,533 | B2 * | 1/2004 | Bernard et al. ............. | 174/101 |
| 6,872,888 | B2 * | 3/2005 | Santelli, Jr. ................. | 174/68.1 |
| 6,874,969 | B2 * | 4/2005 | Jadaud et al. ............... | 403/92 |
| 7,154,051 | B2 * | 12/2006 | Mathieu ....................... | 174/480 |
| 7,223,925 | B2 * | 5/2007 | Ewer et al. .................. | 174/481 |
| 7,234,889 | B2 * | 6/2007 | Gautier ........................ | 403/403 |
| 7,332,675 | B2 * | 2/2008 | Galasso ........................ | 174/97 |

FOREIGN PATENT DOCUMENTS

| | | |
|---|---|---|
| DE | 20 2005 012520 | 11/2005 |
| EP | 1 178 251 | 2/2002 |

OTHER PUBLICATIONS

French Search Report dated Jun. 19, 2008, from corresponding French application.

* cited by examiner

Primary Examiner — Terrell McKinnon
Assistant Examiner — Michael McDuffie
(74) Attorney, Agent, or Firm — Young & Thompson

(57) ABSTRACT

A corner accessory for placing at the junction between at least two ducts that extend in different directions, includes two distinct flaps, one of which has a projecting element and the other of which includes an elongate opening, the projecting element being engaged in the elongate opening so as to move along a longitudinal direction of the opening to allow the flaps to move relative to each other. According to the invention, the elongate opening has a longitudinal edge parallel to the longitudinal direction and opening out locally to a slot that opens out into a free edge of the flap.

15 Claims, 3 Drawing Sheets

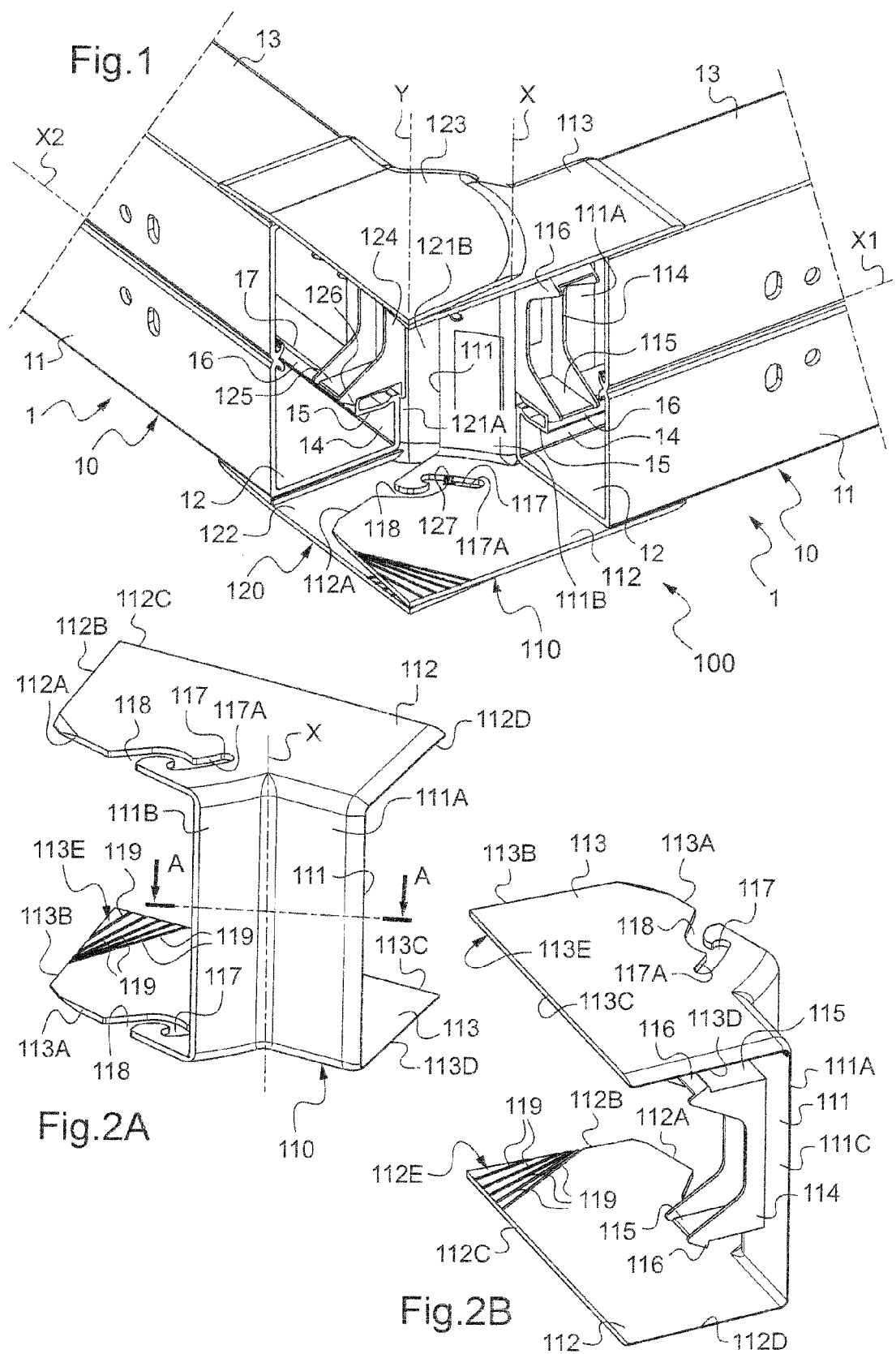

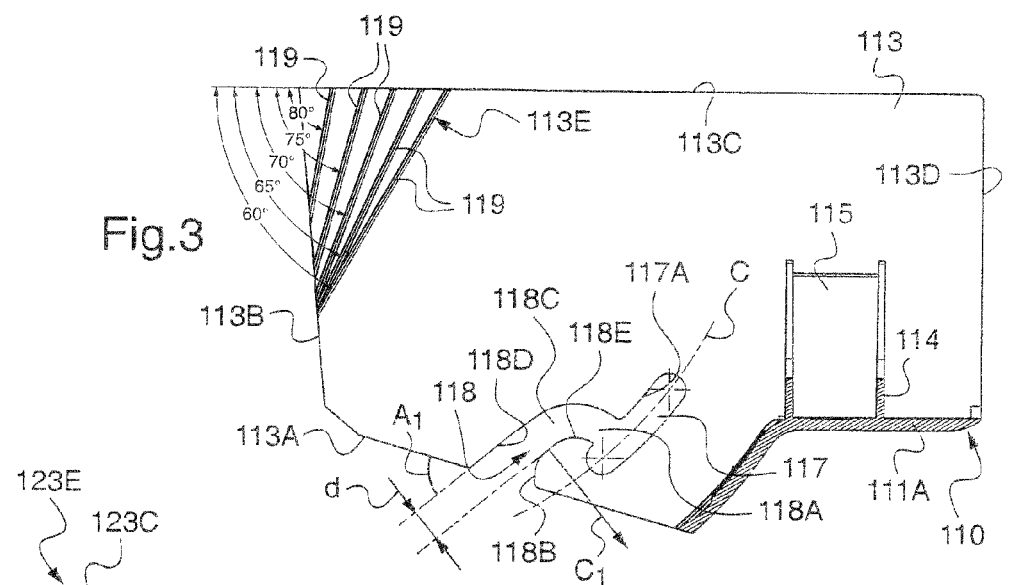
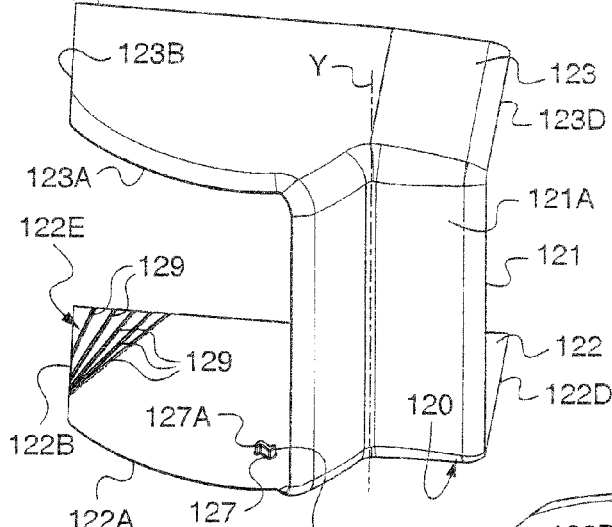
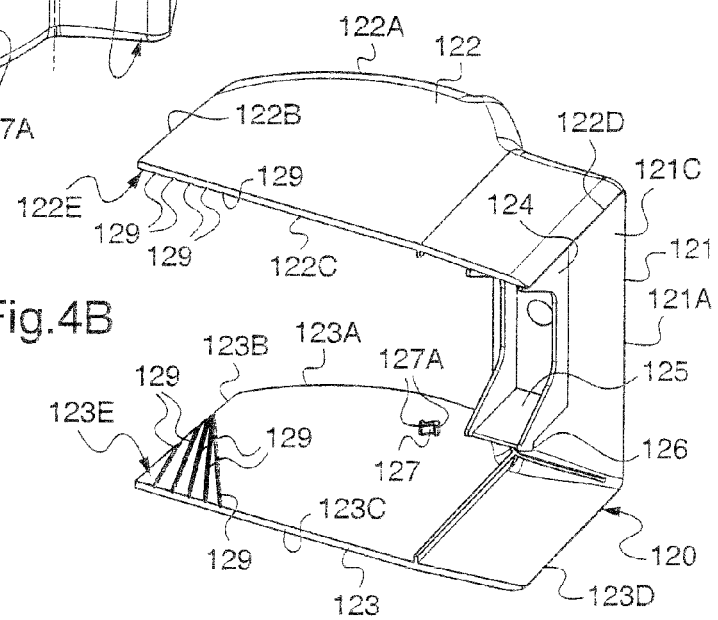

CORNER ACCESORY FOR DUCTS

TECHNICAL FIELD TO WHICH THE INVENTION RELATES

The present invention relates in general to ducts of the type used, for example, to support, house, and protect various pieces of equipment, such as pieces of electrical equipment, and also to support, house, and protect cables, conductors, pipes, or other pieces of equipment needed for serving said pieces of equipment.

More particularly, the invention relates to a corner accessory for placing at the junction between at least two ducts that extend in different directions, the accessory comprising two distinct flaps, one of which has a projecting element and the other of which includes an elongate opening, said projecting element being engaged in said elongate opening so as to move along a longitudinal direction of said opening to allow said flaps to move relative to each other.

A particularly advantageous application of the invention lies in making an inside corner or an outside corner accessory for ducts.

TECHNOLOGICAL BACKGROUND

A corner accessory of this type is already known, in particular from document EP 1 178 251, which accessory has one flap carrying on the inside faces of its facing rims studs that engage in oblong circularly-arcuate openings of closed outline that are provided in the facing rims of the other flap.

The flaps are assembled together by squeezing together a little the rims of the flap that include said openings so as to deform them elastically and engage said studs in said openings.

Such an accessory presents several drawbacks.

Firstly, it is difficult to assemble together the two flaps of the accessory since that requires said flaps to be deformed and the studs to be brought into alignment with the respective openings while they are unseen.

In addition, in order to limit the deformation required of the flap including said openings, and thus make the flaps easier to assemble together, the studs provided on the other flap are of small height. Thus, in the event of an impact against said flap, it is easy for the studs to escape from said openings, thereby disassembling the flaps.

OBJECT OF THE INVENTION

In order to remedy the above-mentioned drawbacks of the state of the art, the invention proposes a corner accessory having flaps that are arranged in such a manner as to make them easier to assemble together while ensuring that an impact against said flaps will not cause them to come apart, and regardless of their relative position in use.

More particularly, the invention provides a corner accessory of the type defined in the introduction, wherein said elongate opening has a longitudinal edge parallel to said longitudinal direction and opening out locally to a slot that opens out into a free edge of said flap.

Other characteristics of the corner accessory of the invention that are non-limiting and advantageous are as follows:

said slot has an end portion that opens out perpendicularly into said longitudinal edge of said elongate opening;

said slot has a flared end portion that opens out into said free edge of the flap;

between its two open end portions, said slot follows a rounded path;

said slot has an outer edge that, at the junction with the free edge of said flap, extends in a direction that forms an acute angle relative to said free edge;

the angle forms between the outer edge of said slot and the free edge of said flap lies in the range 50 degrees to 60 degrees;

the rounded edge of the slot presents curvature directed towards the inside of said flap;

said longitudinal direction of the elongate opening extends along a circular arc directed towards an outside corner of the flap;

the rounded path of said slot, and the elongate opening present respective curvatures directed in opposite directions;

said elongate opening presents a width that matches the width of the projecting element in a manner such that, as it moves in said opening, it slides against the longitudinal edges thereof;

each flap comprises a web between two facing flanges on two opposite sides extending substantially at right angles to said web, said projecting element being provided on the inside face of a flange of the flap that partially covers the flange provided with said elongate opening of the other flap;

on the facing inside faces of its flanges, one of said flaps carries two facing projecting elements, and in correspondence therewith, in its flanges, the other of said flaps includes said elongate openings that are open via said slots to the free edges of the flap that are covered by the flanges of the first flap; and each flap includes weakening grooves in the inside face of each of its flanges in a corner that superposes the corresponding corner of one of the flanges of the other flap, the weakening grooves making it easier to cut off a portion of the corresponding flange.

BRIEF DESCRIPTION OF THE DRAWINGS

The following description with reference to the accompanying drawings, given by way of non-limiting example, makes it clear what the invention consists in and how it can be reduced to practice.

In the accompanying figures:

FIG. 1 is a diagrammatic view of the inside of the corner accessory of the invention disposed at the junction between two ducts extending in different directions;

FIG. 2A is a diagrammatic perspective view of the outside of one of the flaps of the FIG. 1 corner accessory;

FIG. 2B is a diagrammatic perspective view of the inside of the FIG. 2A flap;

FIG. 3 is a section view on plane A-A of the FIG. 2A flap;

FIG. 4A is a diagrammatic perspective view of the outside of the other flap of the FIG. 1 corner accessory;

FIG. 4B is a diagrammatic perspective view of the inside of the FIG. 4A flap.

DETAILED DESCRIPTION OF AN EMBODIMENT

Figure 5A:
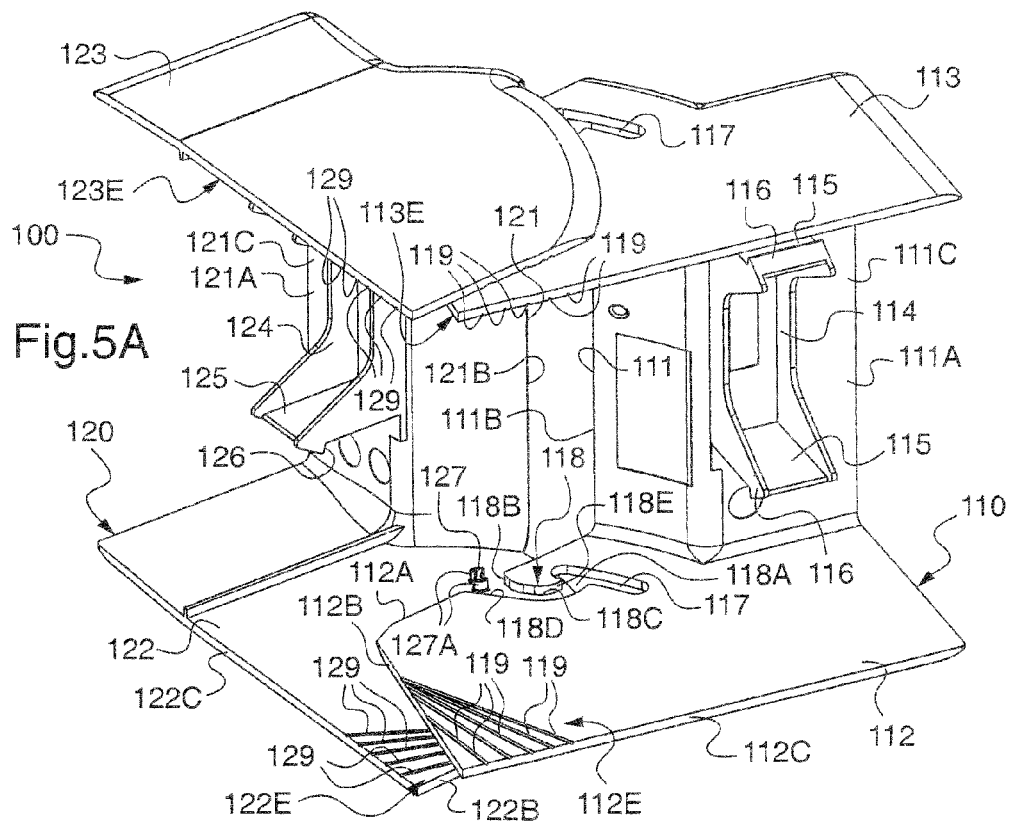
FIGS. 5A and 5B are diagrammatic views showing the assembly of the two flaps of FIGS. 2A and 4A as seen from the inside.

FIG. 1 shows a corner accessory 100 disposed at the junction between two ducts 1 that extend in different directions X1 and X2.

The corner accessory 100 shown is an inside corner accessory that is particularly suitable for joining together two ducts 1 that in practice, form between them an angle lying in the range 60° to 95°, and preferably equal to 90°.

Considering two walls (not shown) that form between them a reentrant dihedral, the bases 10 of the two ducts 1 lie flat against respective ones of these two walls, e.g. they run along the bottoms thereof as baseboards.

The bases 10 of the ducts 1 are cut and positioned edge to edge so that their back faces are practically touching, so as to form substantially the same reentrant angle as is formed between the walls supporting them.

As can be seen more particularly in FIG. 1, the bases 10 of the ducts 1 are generally of channel-section with a back-forming web 11 and two parallel flanges 12, 13 projecting perpendicularly from either side of said web 11.

Between the two flanges 12, 13 of each base 10 there are defined a longitudinal opening together with a space for receiving various cables and pieces of electrical equipment.

The longitudinal opening in each base 10 is closed by cover segments (not shown in FIG. 1) that have snap-fastener tabs for engaging arrangements inside the base 10.

In addition, the longitudinal opening of each base 10 of each duct 1 lies between two mutually-parallel reentrant longitudinal walls 15 that are also parallel to the flanges 12, 13 of the base 10. Each reentrant wall 15 is attached to the free edge of a rim 14, extending perpendicularly therefrom. The longitudinal opening is provided with two clip-fastener strips suitable for enabling the cover segments to be mounted.

In particular, each clip-fastener strip has a longitudinally-extending margin 17 that is connected by a spacer 16 to the free inside end of the corresponding reentrant wall 15. This spacer 16 co-operates with said longitudinally-extending margin 17 and the reentrant wall 15 to define a longitudinal groove that is open towards the front of the base 10 of the duct 1.

Each cover segment (not shown in FIG. 1) carries perpendicularly to its rear face, in parallel along each of its two longitudinal edges, both a row of engagement tabs for engaging in the corresponding longitudinal groove of the base 10, and a row of snap-fastener tabs for catching under the longitudinal groove.

The corner accessory 100 is a cover that locally takes the place of the cover segment of each duct 1, covering the cut ends of the flanges 12, 13 of said bases 10 and the corresponding rims 14. It also preferably covers the top ends of said cover segments.

Figure 5B:
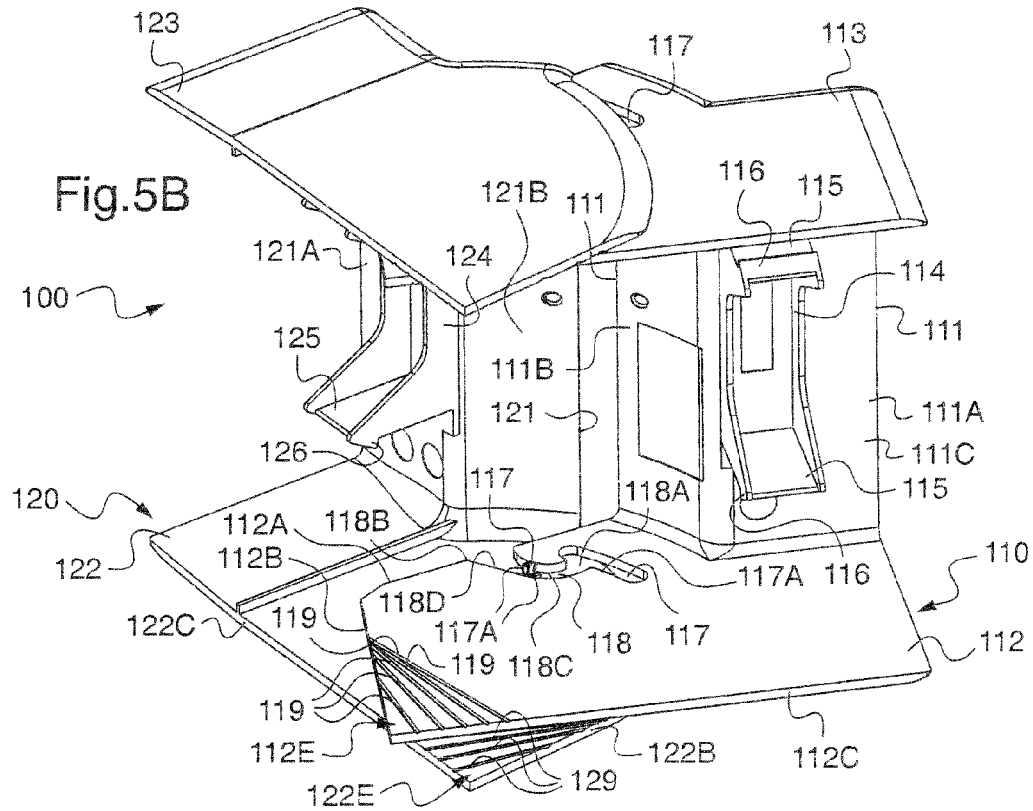

As can be seen more particularly in FIGS. 1, 5A, and 5B, the corner accessory 100 comprises two distinct flaps 110 and 120 that are assembled together to allow one flap to move relative to the other.

Each flap 110, 120 is advantageously made as a one-piece molding of a plastics material.

It has a channel-section with a web 111; 121 between two facing flanges 112 & 113; 122 & 123 on opposite sides, extending substantially at right angles relative to the corresponding web 111; 112 (see FIGS. 2B, 4B).

The web 111; 121 of each flap 110; 120 comprises two panels 11A & 11B; 121A & 121B, comprising an outer panel 111A; 121A for covering the cut end of a cover segment of one of the ducts 1, and an inner panel 111B; 121B for superposing at least in part over the inner panel of the other flap so as to close the corner formed between said ducts 1 (see FIG. 1), thereby providing continuity for the covers between the cover segments of said ducts 1.

The two panels 111A & 111B; 121A & 121B of each web 111; 121 meet along an axis X; Y that is perpendicular to said flanges 112 & 113; 122 & 123, and they form an angle between each other (see FIGS. 2A and 4A).

The facing flanges 112 & 113; 122 & 123 of each flap 110; 120 are generally rectangular in shape, each having four free edges 112A, 112B, 112C & 112D; 113A, 113B, 113C & 113D; 122A, 122B, 122C & 122D; and 123A, 123B, 123C & 123D, and one edge connected to the corresponding side of said web 111; 121 (see FIGS. 2A, 2B, 4A, 4B).

The facing flanges 112 & 113; 122 & 123 of each flap 110; 120 are designed to overlap in part over the flanges 12, 13 of the bases 10 of the ducts 1 in a corner accessory. In addition, the flanges 112 & 113 of one flap 110 are superposed in part over the flanges 122 & 123 of the other flap 120 so as to provide continuity in the corner formed by said ducts 1 between the flanges of said ducts.

As shown in FIGS. 1, 2B, 4B, 5A, 5B the webs 111; 121 of said flaps 110; 120 include connection means on their inside faces that are suitable for holding the flaps relative to the ducts 1.

More particularly, the outer panel 111A; 121A of the web 111; 121 of each flap 110; 120 carries on its inside face 111C; 121C a channel-section member 114 having two parallel branches 115; 125 extending perpendicularly to the inside face 111C; 121C of said outer panel 111A; 121A. The two branches 115; 125 of each channel section member 114; 124 carry pairs of teeth 116; 126 on opposite faces for catching behind the spacers 16, under the longitudinal grooves of the base 10 of the corresponding duct 1 (see FIG. 1).

One of the flaps 110 thus catches on the base 10 of a duct 1, while the other flap 120 catches on the base 10 of the other duct 1.

According to a particularly advantageous characteristic of the corner accessory 100, one of the flaps 120 has a projecting element 127 and the other flap 110 has an elongate opening 117, said projecting element 127 being engaged in said elongate opening 111 so as to move along said opening 117 in a longitudinal direction C in order to allow said flaps 110; 120 to move relative to each other.

According to an essential characteristic, said elongate opening 117 has a longitudinal edge 117A parallel to the longitudinal direction C of said opening 117, opening out locally into a slot 118 that in turn opens out into one of the free edges 113A of said flap 110 (see FIG. 3).

Said projecting element 127 is provided on the inside face 122E of a flange 122 of the flap 120 that partially covers the flange 112 provided with said elongate opening 117 in the other flap 110.

As shown in the figures, on the facing inside faces 122E & 123E of its two flanges 122 & 123, one of said flaps 120 carries two facing projecting elements 127, and correspondingly, in its two facing flanges 112 & 113, the other of said flaps 110 includes said elongate openings 117 that are open via said slots 118 to the free edges 112A & 113A of the flap 110 that are covered by the flanges 122 & 123 of the first flap 120 (see FIGS. 1, 5A, 5B).

As shown more particularly in FIG. 3, in the embodiment shown, each slot 118 has an end portion 118A opening out perpendicularly into said longitudinal edge 117A of said elongate opening 117 in the corresponding flange 113.

Each slot 118 opens out into a location of said elongate opening 117 where, once inserted in said opening 117, the projecting element 127 can no longer escape while it is being moved for the purpose of adjusting the relative position of the two flaps 110; 120. Thus, each slot 118 does not open out into the middle of the longitudinal edge 117A of said opening 117, but opens out at a point that is about one-third of the way along its length.

In addition, each slot 117 has an opposite end portion 118B that is flared, opening out into said free edge 113A of the flap 110. This flared end portion 118B forms a funnel that makes it easier to insert the corresponding projecting element 117 into the slot 118.

Between its two open end portions 118A & 118B, each slot 118 follows a rounded path 118C. The rounded path 118C of each slot 118 is defined by an outer edge 118D and an inner edge 1.18E of the slot.

At the junction with the free edge 113A of said flap 110, said outer edge 118D extends in an oblique direction making an acute angle A1 with said free edge 113A. The angle formed between the outer edge 118D of each slot 118 and the free edge 113A of said flap 110 preferably lies in the range 50 degrees to 60 degrees. The rounded path 118C of each slot presents curvature C1 directed towards the inside of said flap, i.e. towards said free edge 113A of the flap beside the inside face 111C of the web 111.

Advantageously, as shown in FIG. 3, the longitudinal direction of each elongate opening 117 extends along an arc of a circle C that is oriented towards an outer corner of the flap 110. Thus, the curvatures C1 and C of the rounded path 118C of the slot 118 and of the corresponding elongate opening 117 are oriented in opposite directions.

In this embodiment, each elongate opening 117 is preferably oblong in shape.

The width of each elongate opening 117 is identical to the width d of the corresponding slot 118.

This width d matches the width of the projecting element 127 so that as it moves along said slot 118 and then within said opening 117 it slides against the edges 118D, 118E, 117A, thereof.

The width d in this embodiment is equal to about 10 millimeters (mm).

Each projecting element 127 is a stud of shape that is inscribed within a circle of diameter that is equal to about 10 mm, ignoring clearance. It presents height that is substantially equal to or slightly greater than the thickness of the corresponding flange 113 of the flap 110 that includes the elongate opening 117 along which it is to move. In addition, on its sides, it presents two projections 127A with rounded surfaces for sliding along the edges 118D, 118E, and 117A of the slot 118 and of the elongate opening 117 in the corresponding flange 113 of the flap 110.

Furthermore, as can be seen in FIGS. 2A, 2B, 3, 4A, 4B, 5A, and 5B, each flap 110; 120 includes weakening grooves 119; 129 in the inside face 112E & 113E; 122E & 123E of each of its flanges 112 & 113; 122 & 123, and in a corner that is superposed with the corresponding corner of one of the flanges of the other flap, which weakening grooves 119; 129 make it easier to cut off the corresponding portion of the flange.

These weakening grooves 119; 129 extend from one free edge 112B & 113B; 122B & 123B to another free edge 112C & 113C; 122C & 123C that is adjacent and that defines said corner of the corresponding flange 112 & 113; 122 & 123 of the flap 110; 120. Each of these weakening grooves 119 co-operates with one of said free edges 113C that is opposite the free edge 113A to which said slot 118 opens out, to form a particular acute angle (see FIG. 3). Thus, in this embodiment, each flange of each flap 110; 120 has five weakening grooves 119; 129 placed at the following acute angles: 60°, 65°, 70°, 75°, and 80°. These angles correspond to different relative angular orientations that can be taken up by said flaps 110; 120 of the corner accessory 100 in order to adapt to the two ducts 1 that meet at an angle.

As shown in FIGS. 5A and 5B, the two flaps 110; 120 of the corner accessory 100 are assembled together merely by engaging the flanges 122 & 123 of the flap 120 carrying said projecting elements 127 on its inside onto the flanges 112 & 113 of the flap 110 that include said elongate openings 117. In this way, each projecting element 127 engages easily in the funnel-shaped opening 118B of each corresponding slot 118 and is guided by the oblique outer edge 118D thereof to the rounded path 118C and then to the corresponding elongate opening 117.

When both projecting elements 127 are engaged in the elongate openings 117, the inner panels 111B; 121B of the webs 111; 121 of the flaps 110; 120 overlap in part to close the corner formed between said flaps 110; 120. It then suffice to cause said projecting elements 127 to slide in said elongate openings 117 in order to move the flaps 110; 120 relative to each other along the circular arc C so as to vary the area of overlap between said inner panels 111B; 121B. This serves to vary the angle formed between said flaps so as to adjust the opening of the corner accessory 100 to the corner formed by said ducts 1 at the junction between them where the accessory is to be fitted.

When the angle formed by the angle accessory 100 is set, the corresponding portions of the flanges 112 & 113; 122 & 123 of the flaps 110; 120 are cut off or broken along a weakening groove 119; 129 so that the truncated corners of said angle accessory 100 bear properly against the walls that support said ducts 1.

The present invention is not limited in any way to the embodiment described and shown, and the person skilled in the art knows how to make any variant within the spirit of the invention.

What is claimed is:

1. A corner accessory for placing at the junction between at least two ducts that extend in different directions, the accessory comprising two distinct flaps, one of which has a projecting element and the other of which includes an elongate opening, said projecting element being engaged in said elongate opening so as to move along a longitudinal direction of said opening to allow said flaps to move relative to each other, wherein said elongate opening has a longitudinal edge parallel to said longitudinal direction and opening out locally to a slot that opens out into a free edge of said flap.

2. A corner accessory according to claim 1, wherein said slot has an end portion that opens out perpendicularly into said longitudinal edge of said elongate opening.

3. A corner accessory according to claim 2, wherein said slot has a flared end portion that opens out into said free edge of the flap.

4. A corner accessory according to claim 3, wherein between its two open end portions, said slot follows a rounded path.

5. A corner accessory according to claim 4, wherein said slot has an outer edge that, at the junction with the free edge of said flap, extends in a direction that forms an acute angle relative to said free edge.

6. A corner accessory according to claim 5, wherein the angle forms between the outer edge of said slot and the free edge of said flap lies in the range 50 degrees to 60 degrees.

7. A corner accessory according claim 4, wherein the rounded edge of the slot presents curvature directed towards the inside of said flap.

8. A corner accessory according to claim 7, wherein said longitudinal direction of the elongate opening extends along a circular arc directed towards an outside corner of the flap.

9. A corner accessory according to claim 8, wherein said longitudinal direction of the elongate opening extends along a circular arc directed towards an outside corner of the flap, and wherein the rounded path of said slot, and the elongate opening present respective curvatures directed in opposite directions.

10. A corner accessory according to claim 1, wherein said elongate opening presents a width that matches the width of the projecting element in a manner such that, as it moves in said opening, it slides against the longitudinal edges thereof.

11. A corner accessory according to claim 1, wherein each flap comprises a web between two facing flanges on two opposite sides extending substantially at right angles to said web, said projecting element being provided on the inside face of a flange of the flap that partially covers the flange provided with said elongate opening of the other flap.

12. A corner accessory according to claim 11, wherein, on the facing inside faces of its flanges, one of said flaps carries two facing projecting elements, and in correspondence therewith, in its flanges, the other of said flaps includes said elongate openings that are open via said slots to the free edges of the flap that are covered by the flanges of the first flap.

13. A corner accessory according to claim 11, wherein each flap includes weakening grooves in the inside face of each of its flanges in a corner that superposes the corresponding corner of one of the flanges of the other flap, the weakening grooves making it easier to cut off a portion of the corresponding flange.

14. A corner accessory according to claim 1, wherein said slot has a flared end portion that opens out into said free edge of the flap.

15. A corner accessory according to claim 1, wherein said longitudinal direction of the elongate opening extends along a circular arc directed towards an outside corner of the flap.

* * * * *